United States Patent
Hoge et al.

(10) Patent No.: US 6,550,710 B2
(45) Date of Patent: *Apr. 22, 2003

(54) TAPE CARTRIDGE LEADER FOR SINGLE REEL TAPE CARTRIDGES HAVING INCREASED FLEXIBILITY FOR IMPROVED PERFORMANCE

(75) Inventors: David Thomas Hoge, Westminister, CO (US); William J. Vanderheyden, Loveland, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/178,755

(22) Filed: Jun. 24, 2002

(65) Prior Publication Data

US 2003/0015614 A1 Jan. 23, 2003

Related U.S. Application Data

(62) Division of application No. 09/910,089, filed on Jul. 20, 2001, now Pat. No. 6,439,489.

(51) Int. Cl.[7] ................................................. G03B 1/58
(52) U.S. Cl. ...................................... 242/332.4; 242/582
(58) Field of Search ........................... 242/332.4, 332.7, 242/332.1, 332.2, 348, 348.2, 348.3, 532.1, 532.6, 532.7, 582, 336, 338; 360/132

(56) References Cited

U.S. PATENT DOCUMENTS

| | | | |
|---|---|---|---|
| 3,150,840 A | 9/1964 | Briskin et al. | |
| 3,227,387 A | 1/1966 | Laa et al. | |
| 3,254,856 A | 6/1966 | Camras | |
| 3,379,387 A | 4/1968 | Takahashi et al. | |
| 3,620,893 A * | 11/1971 | Tarrson | 242/332.7 |
| 3,655,145 A | 4/1972 | Olsen | |
| 3,690,582 A | 9/1972 | Duvall | |
| 3,706,423 A | 12/1972 | Neff | |
| 3,764,088 A | 10/1973 | Yamada et al. | |
| 3,809,218 A | 5/1974 | Furst | |
| 4,090,680 A | 5/1978 | Karsh | |
| 4,572,460 A * | 2/1986 | Hertrich | 242/332.4 |
| 4,662,049 A | 5/1987 | Hertrich | |
| 4,720,913 A * | 1/1988 | Hertrich | 242/332.4 |
| 5,740,983 A * | 4/1998 | Earle et al. | 242/348.3 |
| 5,769,346 A * | 6/1998 | Daly | 242/332.4 |
| 5,971,310 A * | 10/1999 | Saliba et al. | 242/332.4 |
| 6,034,850 A | 3/2000 | Del Genio et al. | |
| 6,050,514 A * | 4/2000 | Mansbridge | 242/332.4 |
| 6,092,754 A * | 7/2000 | Rathweg et al. | 242/332.4 |
| 6,095,445 A | 8/2000 | Hentrich | |
| 6,186,430 B1 | 2/2001 | Zweighaft | |
| 6,311,915 B1 * | 11/2001 | Rathweg | 242/332.4 |
| 6,439,489 B1 * | 8/2002 | Hoge | 242/332.4 |

FOREIGN PATENT DOCUMENTS

| | | |
|---|---|---|
| DE | 100 45 032 A1 | 5/2001 |
| EP | 0 932 155 A2 | 7/1999 |
| EP | 1 008 990 A2 | 6/2000 |
| EP | 1 083 566 A2 | 3/2001 |
| JP | 11167785 A | 6/1999 |
| WO | WO 86/07471 A1 | 12/1986 |

* cited by examiner

Primary Examiner—William A. Rivera
(74) Attorney, Agent, or Firm—Patton Boggs LLP

(57) ABSTRACT

The present tape cartridge leader includes a flex relief aperture, located in the body of the tape cartridge leader between the guide wings. This flex relief aperture enables the tape cartridge leader to bend in a tight radius as the tape cartridge leader is pulled around the tape guide rollers in the tape drive, thereby ensuring that the tape cartridge leader is properly seated on the tape guide rollers as it traverses the tape path in the tape drive. The flex relief aperture also reduces the possibility of cracks forming in the tape cartridge leader where the guide wings meet the body of the tape cartridge leader, which is a problem in existing tape cartridge leaders. The guide wings are also shaped with a lead in radius to reduce to possibility of damage to the guide wings. In addition, the trailing edge of the guide wings includes a lead in chamfer to aid in the guide wings engaging the guide track in the cartridge housing.

7 Claims, 5 Drawing Sheets

TAPE CARTRIDGE LEADER FOR SINGLE REEL TAPE CARTRIDGES HAVING INCREASED FLEXIBILITY FOR IMPROVED PERFORMANCE

CROSS-REFERENCE TO RELATED APPLICATIONS

This application claims priority from and is a divisional of U.S. application Ser. No. 09/910,089, filed on Jul. 20, 2001 now U.S. Pat. No. 6,439,489 entitled "Tape Cartridge Leader For Single Reel Tape Cartridges Having Increased Flexibility For Improved Performance."

FIELD OF THE INVENTION

The invention relates to digital tape cartridges, and in particular, to a tape cartridge leader having improved performance characteristics for use in single reel tape cartridges.

PROBLEM

It is a problem in single reel magnetic tape cartridges to provide a tape cartridge leader that implements all of the features necessary to reliably buckle and unbuckle the tape cartridge leader with the take-up leader, to guide the tape cartridge leader into the take-up reel and to enable the tape cartridge to lock the magnetic tape in place for transport and storage. Present solutions to this problem suffer from tape cartridge leader failures due to the conflicting requirements of all of these functions and the need to implement a plurality of features in close proximity to each other in a limited length of the tape cartridge leader.

Digital data is stored by tape drives on to magnetic tape media utilizing a variety of tape cartridge and tape cassette designs, but in all cases, the magnetic tape media is wound between a pair of tape reels as data is transferred to or from the magnetic tape media. In the art of data storage, the physical space required to store data is an important concern. Referring to FIGS. 1–2, to conserve space, tape drives often use the single reel tape cartridge design shown in FIG. 1, which utilizes a supply reel located within a removable tape cartridge (not shown) and a take-up reel 101 located within the tape drive 100.

After the tape cartridge is inserted into the tape drive 100, the magnetic tape media must be loaded into the tape drive 100. The loading operation includes connecting the magnetic tape media to the take-up reel 101 and winding the magnetic tape media to a start point or read position adjacent a tape head 112. Various methods have been employed to make this connection. FIG. 2 illustrates one such method wherein the magnetic tape media connects to the take-up reel 101 via a buckle 200 between a tape cartridge leader 203 and a take-up leader 201. The tape cartridge leader 203 terminates the magnetic tape media at one end and consists of a strong flexible plastic strip that includes an ovular aperture 202 configured to mate with the take-up leader 201. The take-up leader 201 is a similar strong flexible plastic strip that attaches at one end to the take-up reel 101 using a pair of integrally formed flanges 206 and 207. The opposing end includes a stem 204 and a tab 205 designed to buckle with the ovular aperture 202 on the tape cartridge leader 203.

The take-up leader 201 also includes apertures 209, 210 and 208. When a tape cartridge is not present in the tape drive 100, the take-up leader 201 is wound around a plurality of guide rollers 102–105 in a curvilinear tape path and is secured in place by a rotating catch 106 that extends through the aperture 208. During operation of the tape drive 100, the catch 106 is rotated to an out of the way position to enable the tape drive to wind the magnetic tape media between the take-up reel 101 and the supply reel in the tape cartridge. In addition, the aperture 209 is used by the tape drive 100 to detect when the take-up leader 201 and the tape cartridge leader 203 are in an unbuckled position for ejection of the tape cartridge from the tape drive. The aperture 210 is configured so that the buckle 200, between the take-up leader 201 and the tape cartridge leader 203, aligns with the aperture 210 to reduce the effect of the added height of the buckle 200 during winding around the take-up reel 101.

In similar fashion, the tape cartridge leader 203 consists of a strong flexible plastic strip that includes an ovular aperture 202 that buckles with the stem 204 and tab 205 of the take-up leader 201 of the tape drive. To prevent the tape cartridge leader 203 from being wound entirely into the tape cartridge, beyond the reach of the take-up leader 201 in the tape drive, the tape cartridge is equipped with a rotating cartridge leader retention hook 214 which is fixed to the cartridge housing and that extends through rectangular-shaped aperture 212. In addition, a pair of guide "wings", each consisting of a rectangular-shaped extension in the width direction of the tape cartridge leader 203, follow corresponding guide tracks formed in the opposing supply reel flanges to guide the tape cartridge leader 203 into position, centered between the supply reel flanges. The guide wings are also used as a tape leader retention feature, since they engage stops formed in the guide tracks, to thereby limit the movement of the tape cartridge leader 203 into the tape cartridge.

There are reliability problems with the present design of the tape cartridge leader 203, due to the stress placed on the tape cartridge leader 203 by the wind and rewind operations. In particular, the guide wings can crack and separate from the tape cartridge leader due to the force exerted on the guide wings by the tape drive seating the guide wings against the stops of the guide tracks in the tape rewind operation. Furthermore, the rectangular shape of the guide wings can cause rewind failures, due to the corners of the leading edges of the guide wings becoming damaged and failing to align with the guide tracks. In addition, the relatively short but stiff section of the tape cartridge leader does not flex sufficiently to remain completely in contact with the tape guide rollers in the tape path during the tape wind and rewind operations. The magnetic tape can potentially slip out of the tape path due to the failure of the tape cartridge leader properly seat against the guide rollers. These tape cartridge leader failures can result in the tape cartridge being unusable by the tape drive and/or resulting in an expensive tape cartridge leader repair/replacement.

SOLUTION

The present invention overcomes the problems outlined above and advances the art by providing a tape cartridge leader that has improved performance and reliability. The present tape cartridge leader comprises an elongated main body integrally formed between a first end and a second end. The first end connects to the magnetic tape media that is wound on the supply reel in the tape cartridge. The second end includes an ovular aperture that buckles with the stem and tab of the take up leader of the tape drive.

In the present tape cartridge leader, a flex relief aperture is provided in the tape cartridge leader, located in the body of the tape cartridge leader between the guide wings. This flex relief aperture enables the tape cartridge leader to bend in a tight radius as the tape cartridge leader is pulled around the tape guide rollers in the tape drive, thereby ensuring that the tape cartridge leader is properly seated on the tape guide rollers as it traverses the tape path in the tape drive. The flex relief aperture also reduces the possibility of cracks forming in the tape cartridge leader where the guide wings meet the body of the tape cartridge leader, which is a problem in existing tape cartridge leaders. The guide wings are also shaped with a lead in radius to reduce to possibility of damage to the guide wings. In addition, the trailing edge of the guide wings includes a lead in chamfer to aid in the guide wings engaging the guide track in the cartridge housing.

These modifications to the existing tape cartridge leader improve the performance and reliability of the tape cartridge leader by reliably providing tape cartridge leader flex, guide, stop, and buckling features.

DETAILED DESCRIPTION

Figure 3:
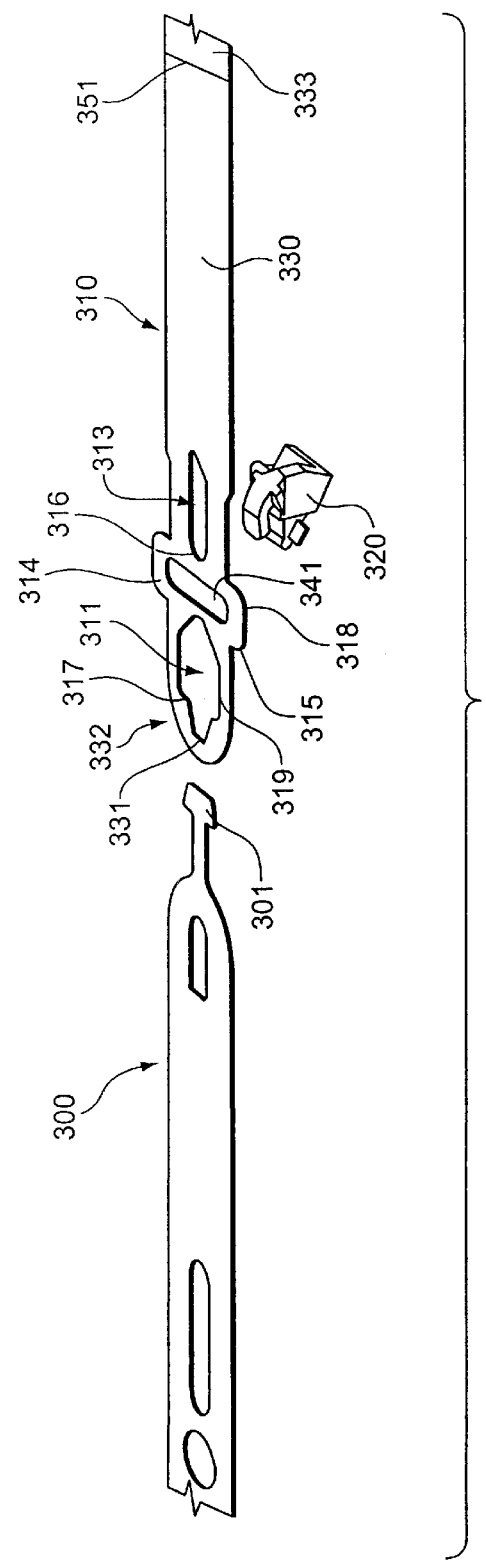
FIG. 3 illustrates a tape cartridge leader according to the present invention connected to a take-up leader.

FIG. 3 illustrates an example of a tape cartridge leader 310 according to the present invention. It is anticipated however, that one skilled in the art will recognize numerous other examples in accordance with the principles described below, and thus, the following examples are for the purpose of illustration and not limitation. Those skilled in the art will also appreciate that various described features could be combined to form multiple variations of the invention.

Advantageously, the present tape cartridge leader 310 is similar in design and function to the conventional tape cartridge leader 203 and is configured for use in a conventional tape drive e.g. 100. The tape cartridge leader 310 comprises an elongated main body 330 integrally formed between a first end 331 and a second end 332. The first end 331 connects to the magnetic tape media 333 that is wound on the supply reel in the tape cartridge. The second end 332 includes an ovular aperture 311 that buckles with the stem and tab 301 of the take-up leader 300 of the tape drive.

In the present tape cartridge leader 310, the hook retention hole 313 is shaped to conform to the shape of the cartridge leader retention hook 320, by using a radius of curvature for the leading edge 316 of the hook retention hole 313 which matches a corresponding radius on the cartridge leader retention hook 320. This reduces stress concentrations (increasing strength and durability) by increasing the surface area where the cartridge leader retention hook 320 mates with and applies force to the hook retention hole 313.

The pair of guide "wings" 314, each consisting of an oval-shaped extension in the width direction of the tape cartridge leader 310, enter the guide tracks that are formed into the opposing surfaces of the two flanges of the supply reel. The guide wings 314, once engaged with the guide tracks, center the tape cartridge leader 310 between the two flanges of the supply reel and align the hook retention hole 313 with the cartridge leader retention hook 320. When the tape cartridge leader 310 is wound onto or off of the take up reel in the tape drive (not shown), there is a small clearance between the outside of the guide wings 314 and the take up reel flanges (not shown). The flange interference reducing radius 315 of the leading edge of the guide wings 314 allows for a greater clearance between the guide wings 314 and the take up reel flanges and serves to minimize the possibility of damage to the guide wings 314. In addition, the trailing edge of the guide wings 314 includes a lead in chamfer 318 to aid in the guide wings 314 engaging the guide track in the cartridge housing (not shown). The primary function of the guide wings 314 is to provide a tape cartridge leader centering function.

Figure 5:
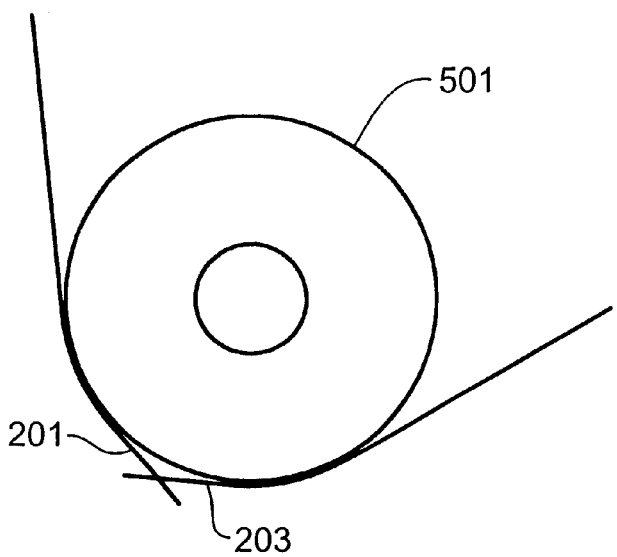
FIGS. 5 & 6 illustrate the tracking of the tape cartridge leader around a tape guide roller for an existing tape cartridge leader and the present tape cartridge leader, respectively.
Figure 6:
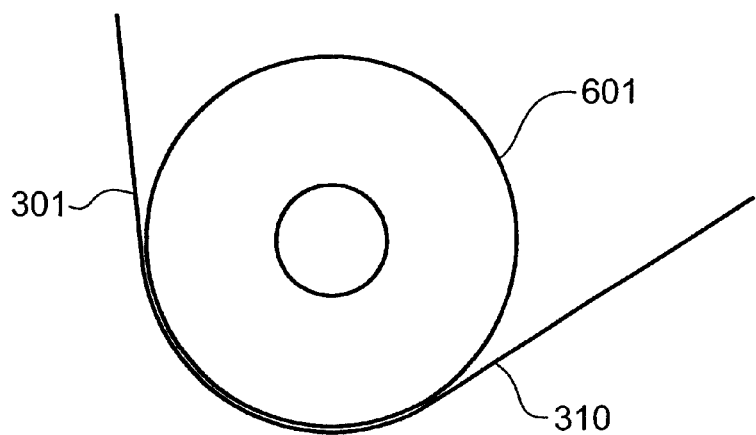
Figure 7:
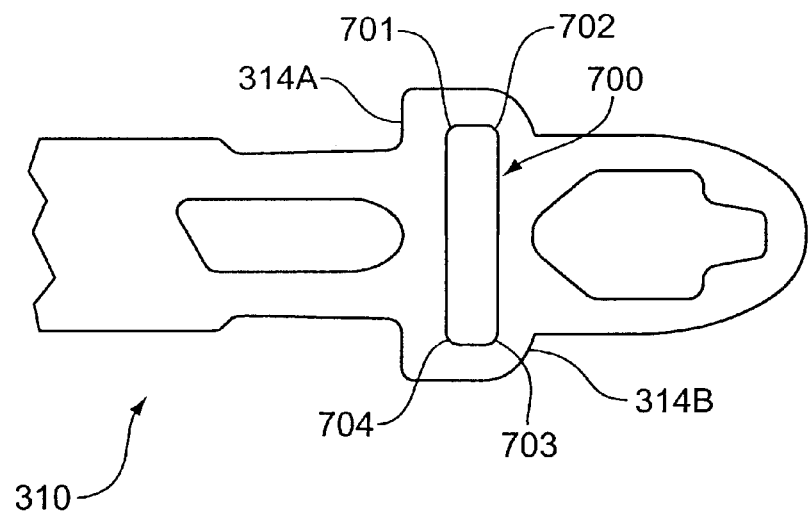
FIGS. 7 & 8 illustrate additional details of two embodiments of the flex relief aperture in the present tape cartridge leader.
Figure 8:
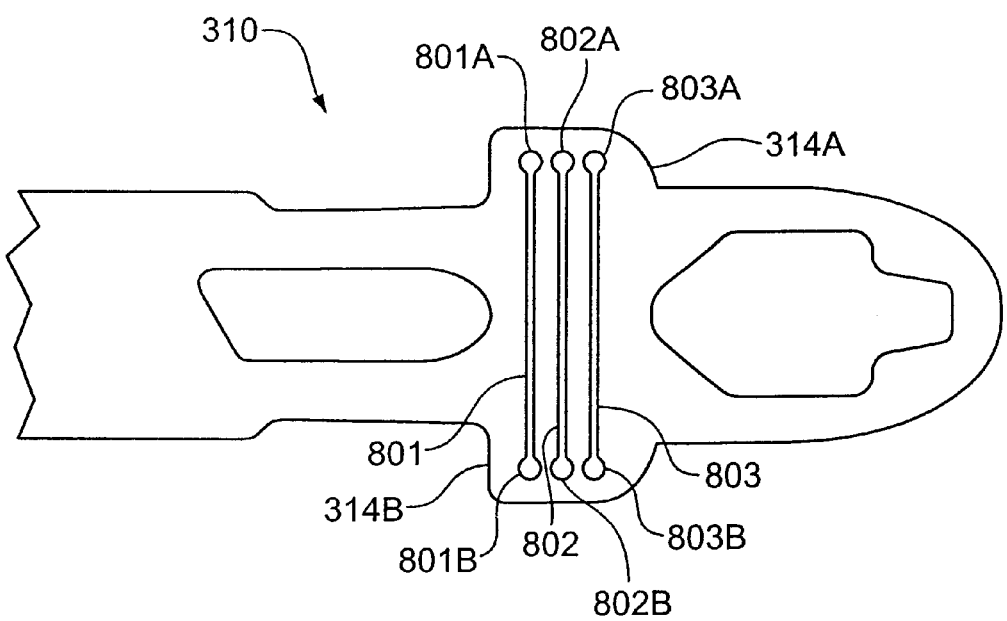

In addition, a flex relief aperture 341 is provided in the tape cartridge leader 310, located in the body of the tape cartridge leader 310 between the guide wings 314. FIGS. 5 & 6 illustrate the tracking of the tape cartridge leader 310 around a tape guide roller 501 for an existing tape cartridge leader and the present tape cartridge leader 310, respectively and FIGS. 7 & 8 illustrate additional details of two embodiments of the flex relief aperture 341 in the present tape cartridge leader 310. This flex relief aperture 341 enables the tape cartridge leader 310 to bend in a tight radius as the tape cartridge leader 310 is pulled around the tape guide rollers 601 in the tape drive, thereby ensuring that the tape cartridge leader 310 is properly seated on the tape guide rollers 601 as it traverses the tape path in the tape drive. As shown in FIG. 5, an existing tape cartridge leader 203 cannot flex sufficiently to conform to the surface of the tape guide roller 501, thereby exposing the tape cartridge leader 203 to slippage, where the tape cartridge leader 203 can slip out of the tape path as it traverses the tape path in the tape drive. In addition, the ends of the tape cartridge leader 203 and the take-up leader 201 do not lie flat against each other, thereby exposing the buckle connection to disconnection. As shown in FIG. 6, the present tape cartridge leader 310 is equipped with a flex relief aperture 341 which enables the tape cartridge leader 310 to flex in a tighter radius than the prior art tape cartridge leader 203 to enable the tape cartridge leader 310 to conform to the surface of the tape guide roller 601. This tighter bending radius also maintains the tape cartridge leader 310 in contact with the take-up leader 301 throughout the extent of the tape path in the tape drive.

The flex relief aperture 341 can be implemented in many forms and FIGS. 7 & 8 illustrate two possible implementations. In FIG. 7, the flex relief aperture 341 comprises a substantially rectangular-shaped aperture 700 with rounded corners 701–704. An alternate implementation of the relief aperture 341 is shown in FIG. 8 where a plurality (three shown for illustrative purposes) of rectangular-shaped slots 801–803 are formed in the body of the tape cartridge leader 310, with at least one slot being terminated at each end thereof by a corresponding round or polygonal-shaped (substantially round) aperture 801A–803B. The shape, number of elements, location, extent and dimensions of the flex relief aperture 341 can be varied to control the degree of flex provided to the tape cartridge leader 310. It is obvious that there are a number of interactive tape cartridge leader characteristics that must be.considered in implementing the flex relief aperture 341, including but not limited to: flexibility, strength, resistance to cracks, deformation, cost of implementation, reliability, proximity to other tape cartridge leader features, and the like. The flex relief aperture 341 is shown as extending from a location in one of the guide wings 314A, across the entire width of the tape cartridge leader and into the other guide wing 314B. The flex relief aperture 341 is also shown as being substantially centered along the longitudinal dimension of the tape cartridge leader 310 within the guide wings 314. The location of the flex relief aperture 341 in the longitudinal direction can be varied, and the uniformity of spacing of the elements 801–803 used to implement the flex relief aperture 341 can also be varied to change the mechanical characteristics of the tape cartridge leader 341. The location of the terminal ends of the flex relief aperture 341 can additionally be varied and the shape of the element(s) used to implement the flex relief aperture 341 can provide flexibility characteristics that are non-uniform across the width of the tape cartridge leader 310 to thereby provide additional flexibility at the wings 314 as compared to the center of the body of the tape cartridge leader 310. The relief aperture 341 also reduces the possibility of cracks forming in the tape cartridge leader 310 where the guide wings 314 meet the body of the tape cartridge leader 310, which is a problem in existing tape cartridge leaders.

The cartridge leader buckling hole 311 comprises two parts: a buckling tip receiving aperture 319 and a mushroom tip receiver segment 312. The buckling tip receiver aperture 319 comprises a target opening through which the mushroom tip 301 of the take-up leader 300 is inserted. The take-up leader 300 is then engaged with the tape cartridge leader 310 by inserting the neck of the mushroom tip 301 into the mushroom tip receiver segment 312, so that the mushroom tip 301 of the take-up leader 300 cannot be pulled loose from the tape cartridge leader 310. In the prior art tape cartridge leader, the cartridge leader buckling hole has sharp corners, on which the mushroom tip of the take-up leader can catch. The present tape cartridge leader 310 has a buckling tip receiving aperture 312 with a lead in radius 317 at the juncture with the mushroom tip receiver segment 312 to reduce the likelihood of the mushroom tip 301 catching on the cartridge leader buckling hole 319. In addition, the size of the buckling tip receiving aperture 311 of the cartridge leader buckling hole 319 is increased over that used in the prior art to thereby provide more reliable engagement of the take-up leader 300 with the tape cartridge leader 310.

Figure 1:
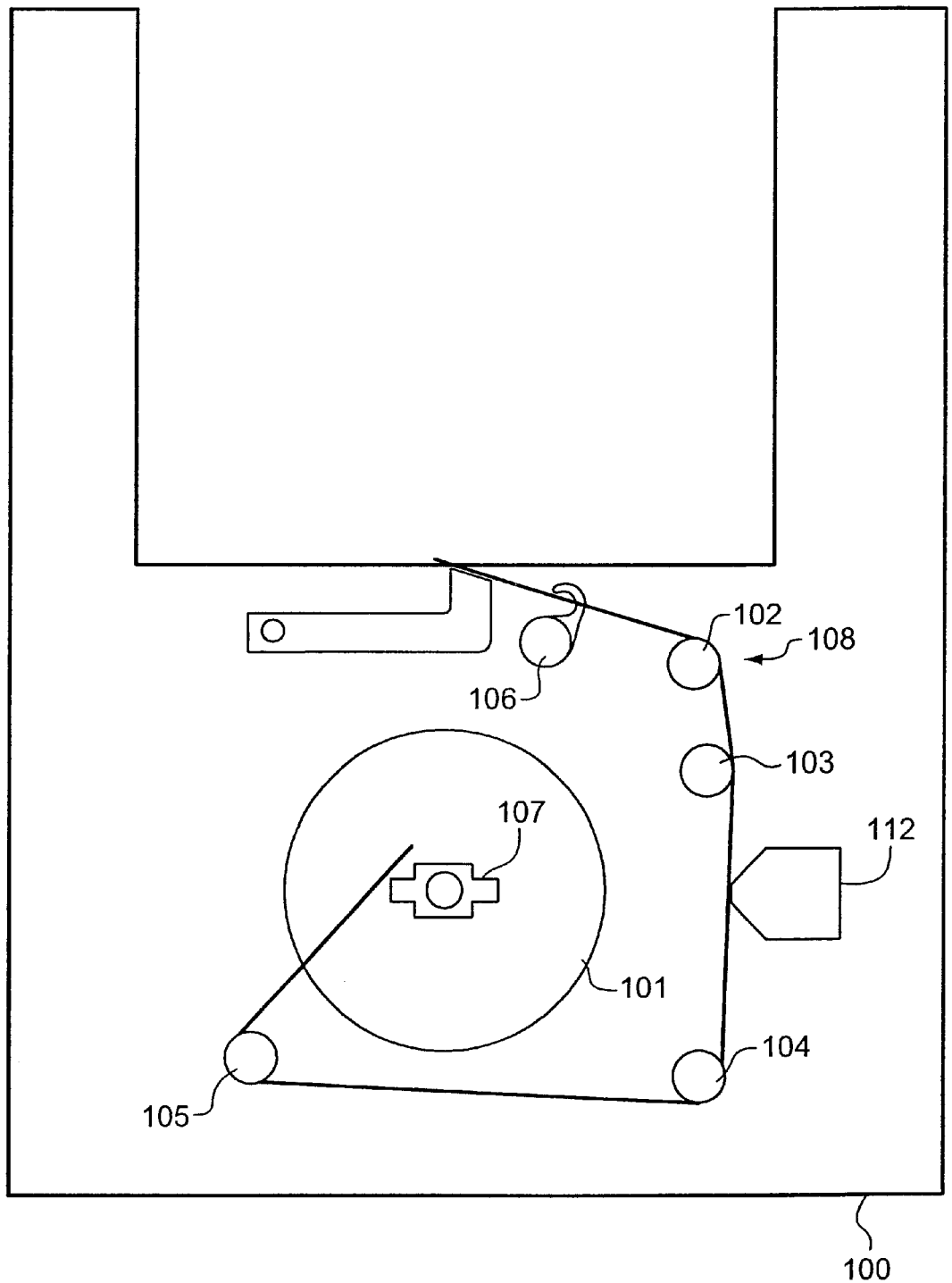
FIG. 1 illustrates an example of a single reel tape cartridge that could incorporate a tape cartridge leader according to the present invention.
Figure 2:
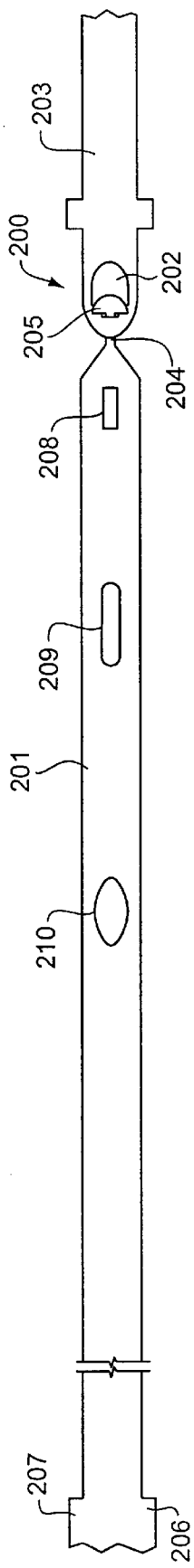
FIG. 2 illustrates an example of a prior art tape cartridge leader connected to a take-up leader.
Figure 4:
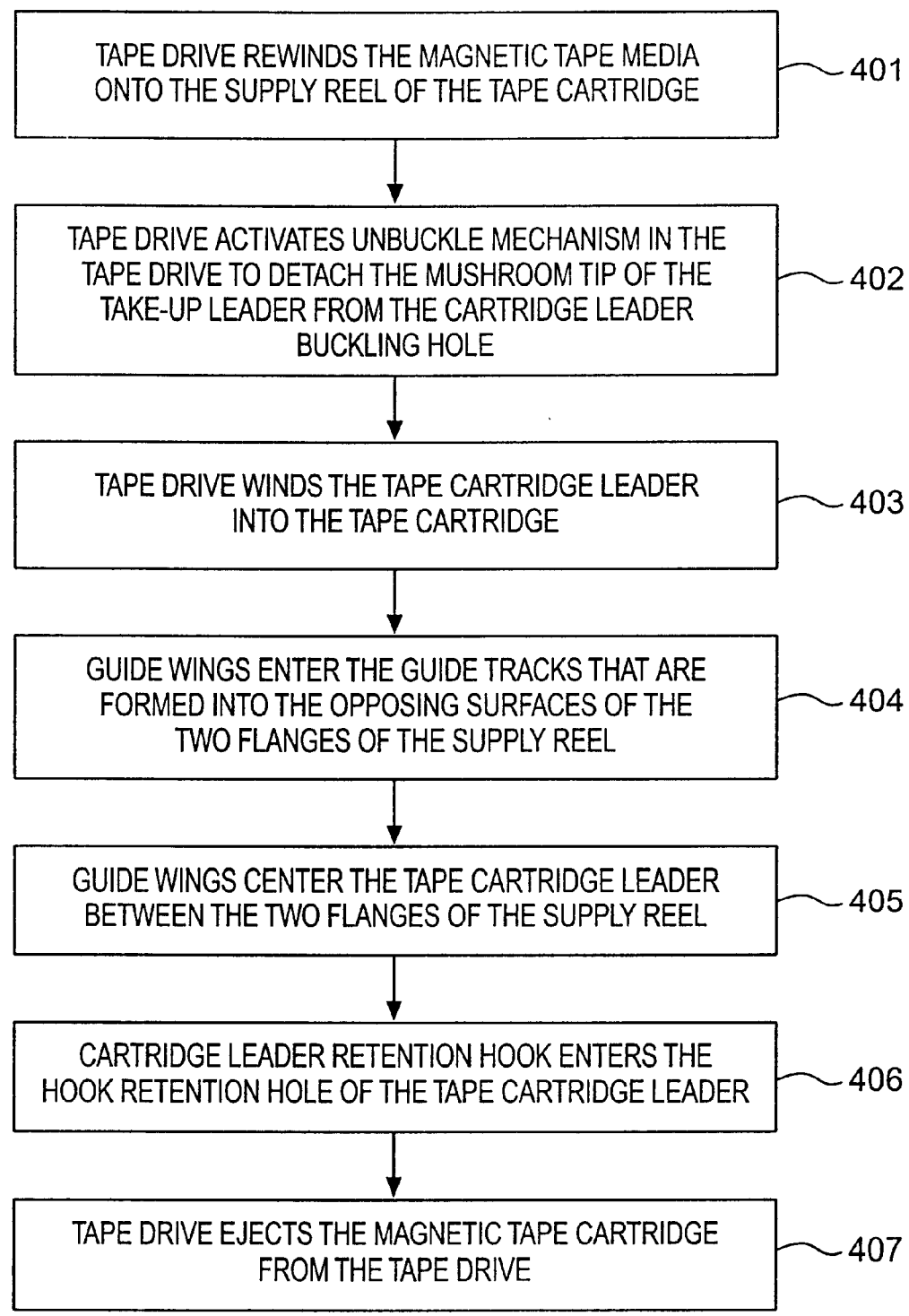
FIG. 4 illustrates in flow diagram form the operation of a tape drive to rewind the magnetic media into a tape cartridge and disengage the tape cartridge leader contained therein, using the present tape cartridge leader.

FIG. 4 illustrates in flow diagram form the operation of a tape drive to rewind the magnetic media into a tape cartridge and disengage the tape cartridge leader contained therein, using the present tape cartridge leader 310. The take-up leader 300 is buckled to the tape cartridge leader 310 in well-known fashion during the read/write operations performed by the tape drive. The magnetic tape media rewind operation that precedes the tape cartridge eject operation and the operation of the present tape cartridge leader 310 are described in the flow diagram of FIG. 4 with reference to the structures disclosed in FIGS. 1 & 3. In particular, at step 401, the tape drive rewinds the magnetic tape media 333 on to the supply reel of the tape cartridge. At step 402, the unbuckle operation is initiated by the tape drive activating an unbuckle mechanism (not shown) in the tape drive to detach, in well known fashion, the mushroom tip 301 of the take-up leader 300 from the cartridge leader buckling hole 319. The tape drive at step 403 then winds the tape cartridge leader 310 into the tape cartridge, where at step 404, the guide wings 314 enter the guide tracks that are formed into the opposing surfaces of the two flanges of the supply reel. The guide wings 314, once engaged with the guide tracks, at step 405 center the tape cartridge leader 310 between the two flanges of the supply reel and align the hook retention hole 313 with the cartridge leader retention hook 320. At step 406, the cartridge leader retention hook 320 enters the hook retention hole 313 of the tape cartridge leader 310 where the radius of curvature for the leading edge 316 of the hook retention hole 313 matches a corresponding radius on the cartridge leader retention hook 320. The magnetic tape media rewind operation completes at step 407 when the tape drive ejects the magnetic tape cartridge from the tape drive.

Those skilled in the art will appreciate that the above-described principles could be applied to other take-up leader designs to realize the advantages of the present invention. Those skilled in the art will also appreciate variations of the above-described embodiments that fall within the scope of the invention. As a result, the invention is not limited to the specific examples and illustrations discussed above, but only by the following claims and their equivalents.

What is claimed is:

1. A tape cartridge leader for terminating a magnetic tape media contained on a supply reel, having a hub and a pair of flanges, in a single reel tape cartridge that is loaded into a tape drive having a take-up reel comprising a hub and a pair of flanges, said tape cartridge leader being detachably connectable to a take-up leader located in a single reel tape drive and connected to said take-up reel so that said magnetic tape media can be wound through a curvilinear tape path internal to the tape drive, said tape cartridge leader comprising:

an elongated main body having an upper edge and a lower edge integrally formed between a first end and a second end, wherein said first end is connected to said supply reel in said tape cartridge;

buckling hole means, located within said second end, for detachably connecting to said take-up leader in the tape drive when the tape cartridge is loaded into the tape drive; and tape cartridge leader centering means, located within said second end, for guiding said tape cartridge leader, comprising:

a pair of guides formed on opposite edges of said elongated main body for guiding said tape cartridge leader between the flanges of said take-up reel, wherein said pair of guides extends vertically beyond said upper edge and said lower edge of said elongated body, a flex relief aperture formed in said main body and extending vertically between said pair of guides to increase the flexibility of said pair of guides.

2. The tape cartridge leader of claim 1, wherein said flex relief aperture comprises:

a substantially rectangular-shaped opening, having two ends, formed in said main body and extending across a width of said elongated main body between said pair of guides.

3. The tape cartridge leader of claim 2, wherein said two ends of said flex relief aperture are located respectively between each of said two ends of said pair of guides.

4. The tape cartridge leader of claim 2, wherein said flex relief aperture is substantially centered in a longitudinal direction within said pair of guides.

5. The tape cartridge leader of claim 1 wherein said pair of guides include a lead in chamfer to aid said pair of guides engaging guide tracks in a tape cartridge housing.

6. The tape cartridge leader of claim 1 wherein said pair of guides are an oval-shaped extension in the width direction of said tape cartridge leader to aid said pair of guides engaging guide tracks formed into opposing surfaces of said pair of flanges of said supply reel.

7. The tape cartridge leader of claim 1 further comprising:
a hook retention hole wherein a leading edge of said hook retention hole is shaped to conform to a shape of a cartridge leader retention hook to increase the surface area where said cartridge leader retention hook mates with and applies force to said hook retention hole.

* * * * *